(12) United States Patent
Kiwaki

(10) Patent No.: US 8,844,590 B2
(45) Date of Patent: Sep. 30, 2014

(54) TIRE WITH TREAD HAVING PROJECTING PORTION PROJECTING FROM GROOVE BOTTOM OF CIRCUMFERENTIAL GROOVE

(75) Inventor: Yukihiro Kiwaki, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 133 days.

(21) Appl. No.: 13/509,937

(22) PCT Filed: Nov. 10, 2010

(86) PCT No.: PCT/JP2010/070042
§ 371 (c)(1),
(2), (4) Date: Jul. 19, 2012

(87) PCT Pub. No.: WO2011/059008
PCT Pub. Date: May 19, 2011

(65) Prior Publication Data
US 2012/0279624 A1 Nov. 8, 2012

(30) Foreign Application Priority Data
Nov. 16, 2009 (JP) ................................. 2009-260929

(51) Int. Cl.
*B60C 11/03* (2006.01)
*B60C 11/113* (2006.01)
*B60C 11/13* (2006.01)

(52) U.S. Cl.
CPC ..... *B60C 11/0302* (2013.01); *B60C 2011/0369* (2013.01); *B60C 2011/0374* (2013.01); *B60C 11/13* (2013.01); *B60C 2011/0341* (2013.01)
USPC ............ 152/209.15; 152/209.18; 152/209.19; 152/209.21; 152/209.22; 152/209.25

(58) Field of Classification Search
USPC .......................... 152/209.15, 209.18–209.19, 152/209.21–209.22, 209.25, 209.28, 902
IPC .................................. B60C 11/11,11/03, 11/13
See application file for complete search history.

(56) References Cited

U.S. PATENT DOCUMENTS 6,823,911 B1 * 11/2004 Himuro ..................... 152/209.15
2007/0062626 A1 * 3/2007 Oyama ..................... 152/209.19

FOREIGN PATENT DOCUMENTS

| JP | 5-254311 A | 10/1993 |
| JP | 8-230415 A | 9/1996 |

(Continued)

OTHER PUBLICATIONS

Machine Translation: JP2010-208419; Fujita, Shungo; No date.*

(Continued)

*Primary Examiner* — Steven D Maki
*Assistant Examiner* — Kendra Shin
(74) *Attorney, Agent, or Firm* — Sughrue Mion, PLLC

(57) ABSTRACT

In a tire 1, a central land portion row 20C and intermediate land portion rows 20M are formed by center-side main grooves 10C. A projecting portion 50 projecting outwardly in a tire radial direction TR from a groove bottom surface 11 of the center-side main groove 10C is provided in the central groove 10C. The projecting portion 50 is located on an extension line L1 extending in an extending direction of lug grooves 30M, and extends outwardly in the tread width direction TW from a sidewall 21 of the central land portion row 20C. An inner end height H1 of the projecting portion 50 located on an innermost side thereof in the tread width direction TW and continuous to the central land portion row 20C is greater than an outer end height H2 of the projecting portion 50 located on an outermost side thereof in the tread width direction TW.

9 Claims, 7 Drawing Sheets

(56) References Cited

FOREIGN PATENT DOCUMENTS

| JP | 2000-247111 A | | 9/2000 | | |
|---|---|---|---|---|---|
| JP | 2002240513 A | * | 8/2002 | .............. | B60C 11/11 |
| JP | 2003-237319 A | | 8/2003 | | |
| JP | 2010208419 A | * | 9/2010 | .............. | B60C 11/11 |

OTHER PUBLICATIONS

Machine Translation: JP2002-240513; Fukunaga, Takayuki; No date.*
International Search Report for PCT/JP2010/070042 dated Jan. 18, 2011.

* cited by examiner

TIRE WITH TREAD HAVING PROJECTING PORTION PROJECTING FROM GROOVE BOTTOM OF CIRCUMFERENTIAL GROOVE

CROSS REFERENCE TO RELATED APPLICATIONS

This application is a National Stage Application No. PCT/JP2010/070042, filed on Nov. 10, 2010, which claims priority from Japanese Patent Application No. 2009-260929, filed on Nov, 16, 2009, the contents of all of which are incorporated herein by reference in their entirety.

TECHNICAL FIELD

The present invention relates to a tire in which lug grooves are formed in at least one of multiple rib-like land portions formed by multiple circumferential grooves.

BACKGROUND ART

Conventionally, for pneumatic tires (hereinafter abbreviated as tires where appropriate) to be mounted on vehicles such as automobiles, a tread pattern is widely employed in which lug grooves crossing multiple circumferential grooves extending in a tire circumferential direction are formed in rib-like land portions formed by the circumferential grooves.

For example, a tire is known in which lug grooves incline with respect to a perpendicular line perpendicular to a tire equator line, in such a manner that the lug grooves are more away from circumferential grooves outwardly in a tread width direction, as the lug grooves extend rearward in a tire rotation direction (see Patent Document 1, for example).

In such a tire, rainwater flowing in the circumferential grooves can be drained efficiently by increasing the angle formed by each lug groove and the perpendicular line (by forming so-called high-angle lug grooves), so that water drainage performance on a wet road surface is improved.

PRIOR ART DOCUMENT

Patent Document

Patent Document 1: Japanese Patent Application Publication No. 5-254311 (Pages 2 to 3, FIG. 1)

SUMMARY OF THE INVENTION

However, when the angle formed by each lug groove and the perpendicular line is increased in the above-described conventional tire, a road-surface-scratching effect (edge effect) is reduced, so that braking performance and driving performance on a snowy road surface deteriorate.

In other words, the water drainage performance on a wet road surface is in a trade-off relationship with the braking performance and driving performance on a snowy road surface. For this reason, it is difficult for conventional tires to have water drainage performance on a wet road surface as well as braking performance and driving performance on a snowy road surface.

In this respect, an objective of the present invention is to provide a tire capable of securing the water drainage performance on a wet road surface, while improving the braking performance and driving performance on a snowy road surface, in a case where lug grooves are formed in at least one of multiple rib-like land portions formed by multiple circumferential grooves.

In order to solve the above-mentioned problem, the present invention has features as described below. The first feature of the present invention is summarized as a tire (pneumatic tire 1), in which a first land portion row (central land portion row 20C) and a second land portion row (intermediate land portion row 20M) are formed, the first land portion row being formed by circumferential grooves (center-side main grooves 10C) extending in a tire circumferential direction (tire circumferential direction TC), the second land portion row being formed outside the first land portion row in a tread width direction (tread width direction TW) by the circumferential grooves and being divided into a plurality of blocks (intermediate blocks 40M) by lug grooves (lug grooves 30M) crossing the circumferential groove, wherein a projecting portion (projecting portion 50) projecting outwardly in a tire radial direction (tire radial direction TR) from a groove bottom surface (groove bottom surface 11) of the circumferential groove is provided in at least the circumferential groove, the projecting portion is located on an extension line (extension line L1) extending in an extending direction of the lug grooves, and extends outwardly in the tread width direction from a sidewall (sidewall 21) of the first land portion row, the sidewall extending in the tire circumferential direction, a height (inner end height H1) of an inner end portion of the projecting portion being located on an innermost side thereof in the tread width direction and being continuous to the first land portion row is greater than a height (outer end height H2) of an outer end portion of the projecting portion located on an outermost side thereof in the tread width direction.

According to such features, the projecting portion is provided in at least the circumferential groove. This improves a road-surface-scratching effect (edge effect) of the projecting portion on a snowy road surface, thereby improving braking performance and driving performance on a snowy road surface.

In addition, the projecting portion extends outwardly in the tread width direction TW from the sidewall of the first land portion row. This improves the rigidity of the first land portion row, thereby preventing the first land portion row from collapsing into the circumferential groove in a case where a transverse force (cornering force) acts on the tire during turning or the like. For this reason, the driving stability can be also improved.

Moreover, the projecting portion is located on the extension line L1 of the lug groove. As a result, rainwater flowing in the circumferential groove collides with the projecting portion, and is guided outwardly in the tread width direction. The guided rainwater passes in the lug groove, and is drained outwardly in the tread width direction. In other words, rainwater flowing in the circumferential groove is dispersed into the lug groove, and hence water drainage performance on a wet road surface can be secured. Moreover, the height (H1) of the inner end portion is greater than the height (H2) of the outer end portion. This secures a certain volume for the circumferential groove, so that water drainage performance on a wet road surface can be secured more reliably.

The second feature of the present invention according to the first feature of the present invention is summarized as an angle (inclination angle θ1) formed by a perpendicular line (perpendicular line LC) perpendicular to a tire equator line (tire equator line CL) and each lug groove being 45 degrees or greater, and the lug groove being more away from the circumferential groove outwardly in the tread width direction, as the lug groove extends rearward in a tire rotation direction (tire rotation direction R).

The third feature of the present invention according to the first or second feature of the present invention is summarized as the outer end portion being located in the lug groove.

The fourth feature of the present invention according to the first to third features of the present invention is summarized as the projecting portion being continuous to a leading-side sidewall (leading-side sidewall 41) located in a front portion of each of the blocks in a tire rotation direction.

The fifth feature of the present invention according to the first to fourth features of the present invention is summarized as a height of the projecting portion gradually decreasing from the inner end portion to the outer end portion, and the outer end portion is continuous to the groove bottom surface of the lug groove.

The sixth feature of the present invention according to the first to fifth features of the present invention is summarized as a width (inner-edge width W1) of the inner end portion perpendicular to an extending direction of the projecting portion being greater than a width (outer-edge width W2) of the outer end portion perpendicular to the extending direction of the projecting portion, and the width (W2) of the outer end portion being smaller than a narrowest width (lug narrow width W3) of the lug groove perpendicular to the extending direction thereof.

The seventh feature of the present invention according to the first to sixth feature of the present invention is summarized as a notched portion (notched portion 60) being formed in the first land portion row, the notched portion being opened to the circumferential groove and terminated in the first land portion row, and a depth (notch depth D1) of the notched portion is smaller than a depth of the circumferential groove.

The eighth feature of the present invention according to the seventh feature of the present invention is summarized as the notched portion having a first wall surface (first wall surface 61), and a second wall surface (second wall surface 62) located rearward of the first wall surface in the tire rotation direction, the first wall surface being provided on an extension line (extension line L2) along a trailing-side side surface (trailing-side side surface 530) located in a rear portion of the projecting portion in the tire rotation direction in a tread plan view, and the second wall surface being provided on an extension line (extension line L3) along a leading-side side surface (leading-side side surface 520) located in a front portion of the projecting portion in the tire rotation direction in the tread plan view.

The features of the present invention can provide a tire capable of securing the water drainage performance on a wet road surface, while improving the braking performance and driving performance on a snowy road surface, in a case where lug grooves are formed in at least one of multiple rib-like land portions formed by multiple circumferential grooves.

MODES FOR CARRYING OUT THE INVENTION

Next, embodiments of a pneumatic tire according to the present invention are described with reference to the drawings. Specifically, descriptions are given of (1) Structure of Pneumatic Tire, (2) Structure of Lug Grooves, (3) Structure of Projecting Portions, (4) Structure of Notched Portions, (5) Comparative Evaluation, (6) Operation and Effects, (7) Modifications, and (8) Other Embodiments.

Note that, in the following description of the drawings, the same or similar reference signs denote the same or similar elements and portions. In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from one another.

(1) Structure of Pneumatic Tire

Figure 1:
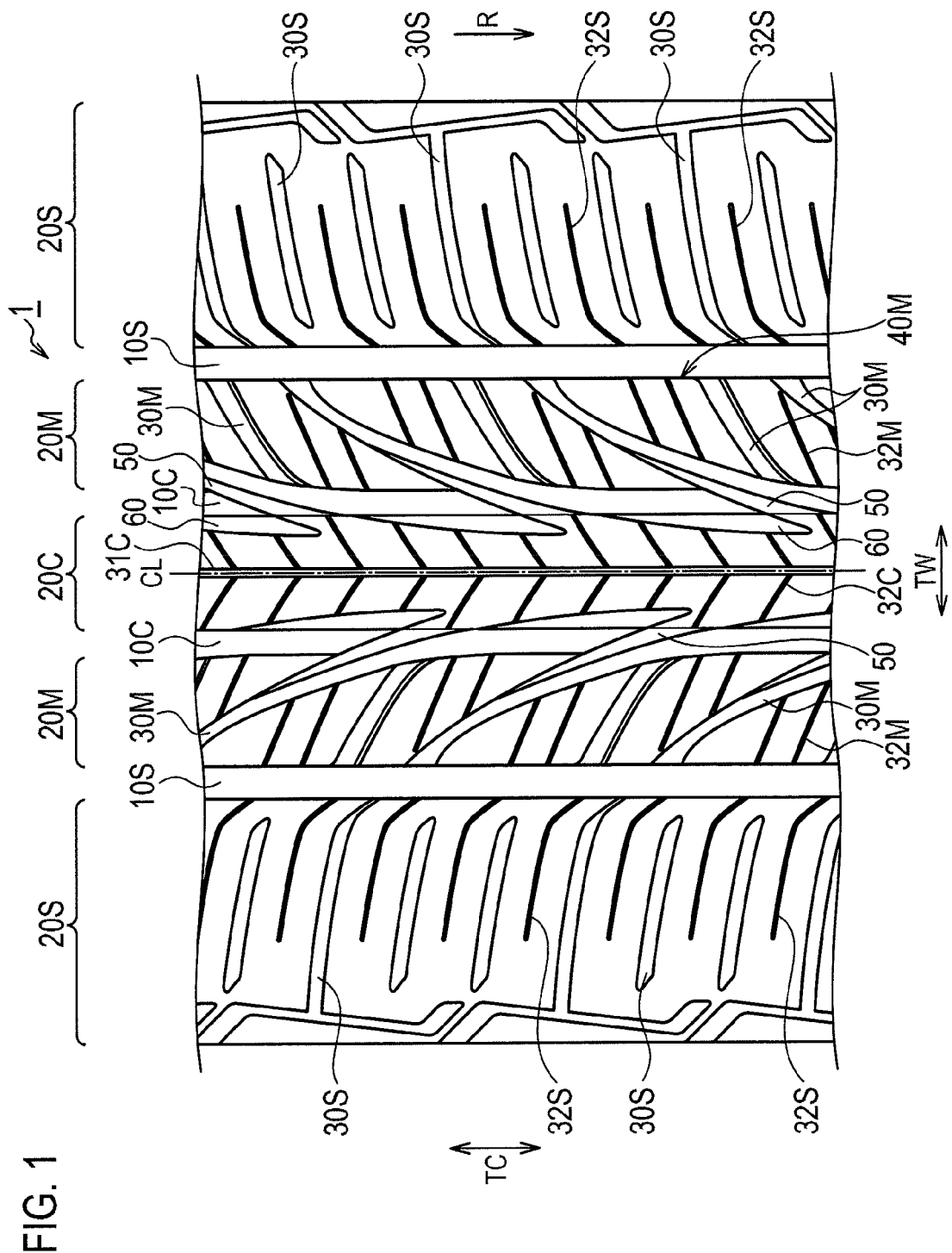
FIG. 1 is a development showing a tread pattern of the pneumatic tire 1 according to this embodiment.

First, a structure of a pneumatic tire 1 according to this embodiment is described with reference to the drawings. FIG. 1 is a development showing a tread pattern of the pneumatic tire 1 according to this embodiment. Note that the pneumatic tire 1 is a common radial tire including a bead portion, a carcass layer, a belt layer, and a tread portion (unillustrated). In addition, the pneumatic tire 1 may be filled not with air, but with an inert gas such as nitrogen gas.

As shown in FIG. 1, in the pneumatic tire 1, multiple land portion rows extending in a tire circumferential direction TC are formed by circumferential grooves extending in the tire circumferential direction TC.

Specifically, the circumferential grooves include a pair of center-side main grooves 10C and a pair of end-side main grooves 10S. The center-side main grooves 10C are formed to be closer to a tire equator line CL than the end-side main grooves 10S. Projecting portions 50 to be described later are provided in at least the center-side main grooves 10C. The end-side main grooves 10S are formed outside the center-side main grooves 10C in a tread width direction TW.

Meanwhile, the land portion rows consist of a central land portion row 20C (a first land portion row), a pair of intermediate land portion rows 20M (second land portion rows), and a pair of outer-end land portion rows 20S.

The central land portion row 20C is provided between the pair of center-side main grooves 10C, while being located on the tire equator line CL. In the central land portion row 20C, a circumferential direction narrow groove 31C extending in the tire circumferential direction TC and width direction narrow grooves 32C extending in a direction (the tread width direction TW in this embodiment) crossing the circumferential direction narrow groove 31C are formed. In addition, notched portions 60 to be described later are formed in the central land portion row 20C. Note that the central land portion row 20C is formed as a rib-like shape continuously extending in the tire circumferential direction TC.

The intermediate land portion rows 20M are formed between the center-side main groove 10C and the end-side main groove 10S, while being adjacent to the central land portion row 20C on an outside thereof in the tread width direction TW. The intermediate land portion row 20M is divided into multiple intermediate blocks 40M by lug grooves 30M to be described later. In each of the multiple intermediate blocks 40M, width direction narrow grooves 32M are formed which extend in a direction (the tread width direction TW in this embodiment) crossing the center-side main grooves 10C and the end-side main grooves 10S.

The outer-end land portion rows 20S are provided outside the end-side main grooves 10S in the tread width direction TW, while being adjacent to the intermediate land portion rows 20M on an outside thereof in the tread width direction TW. In the outer-end land portion row 20S, lug grooves 30S crossing the end-side main groove 10S and width direction narrow grooves 32S extending substantially in parallel to the lug grooves 30S are formed.

(2) Structure of Lug Grooves

Figure 2:
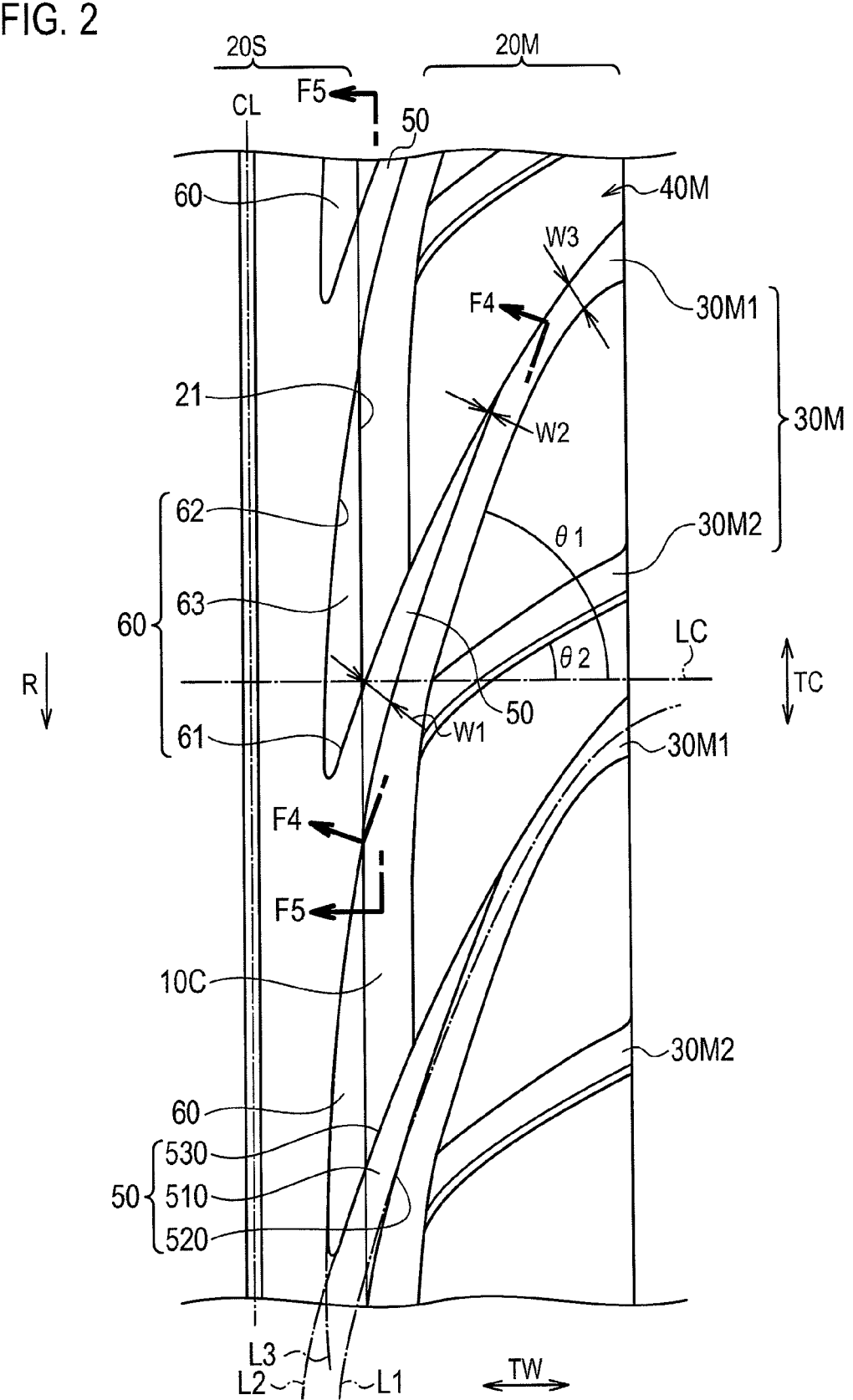
FIG. 2 is an enlarged development showing a vicinity of the lug grooves 30M according to this embodiment.

Next, a structure of the above-described lug grooves 30M is described with reference to the drawings. FIG. 2 is an enlarged development showing a vicinity of the lug grooves 30M according to this embodiment. Note that the width direction narrow grooves 32C and the width direction narrow grooves 32M are omitted in FIG. 2.

As shown in FIG. 2, the lug grooves 30M cross the center-side main groove 10C and the end-side main groove 10S. Specifically, the lug grooves 30M consist of high-angle grooves 30M1 and low-angle grooves 30M2.

The high-angle groove 30M1 inclines with respect to a perpendicular line LC perpendicular to the tire equator line CL at an angle greater than an angle at which the low-angle groove 30M2 inclines. An inclination angle θ1 formed by the perpendicular line LC and the high-angle groove 30M1 is 45 degrees or greater.

The low-angle groove 30M2 inclines with respect to the perpendicular line LC at the angle smaller than the angle at which the low-angle groove 30M2 inclines. An inclination angle θ2 formed by the perpendicular line LC and the low-angle groove 30M2 is smaller than 45 degrees.

The lug groove 30M (the high-angle grooves 30M1 and the low-angle grooves 30M2) curves such that the lug groove 30M is more away from the center-side main groove 10C outwardly in the tread width direction TW, as the lug groove 30M extends rearward in a tire rotation direction R.

Figure 3:
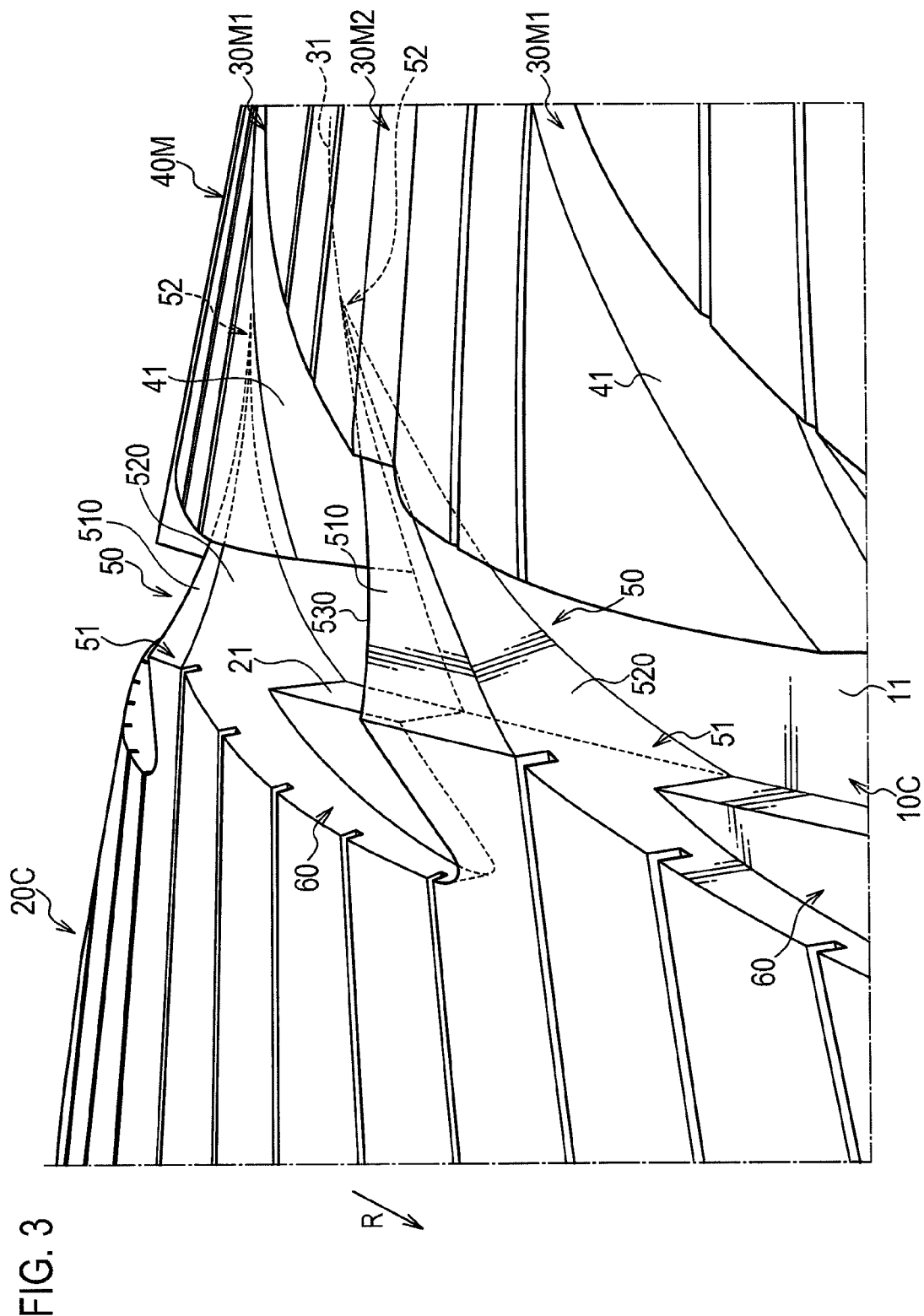
FIG. 3 is an enlarged perspective view showing a vicinity of projecting portions 50 according to this embodiment.

In addition, a depth of the lug groove 30M in a tire radial direction TR (see FIGS. 2 and 3) is equal to a depth of the center-side main groove 10C and the end-side main groove 10S in the tire radial direction TR (see FIG. 3).

(3) Structure of Projecting Portions

Figure 4:
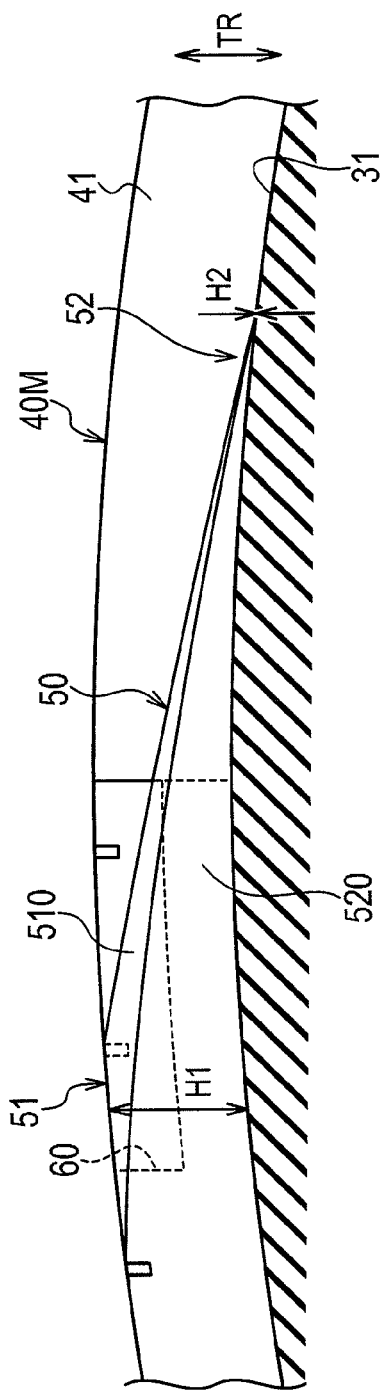
FIG. 4 is a cross-sectional view taken along a line F4-F4 of FIG. 2 and showing a vicinity of the projecting portion 50.

Next, a structure of the projecting portions 50 according to this embodiment is described with reference to the drawings. FIG. 3 is an enlarged perspective view showing a vicinity of projecting portions 50 according to this embodiment. FIG. 4 is a cross-sectional view taken along a line F4-F4 of FIG. 2 and showing a vicinity of the projecting portion 50.

As shown in FIG. 3, the projecting portion 50 projects outwardly in the tire radial direction TR from a groove bottom surface 11 of the center-side main groove 10C. The projecting portion 50 is located on an extension line L1 extending in an extending direction of the high-angle groove 30M1, and extends outwardly in the tread width direction TW from a sidewall 21 of the central land portion row 20C extending in the tire circumferential direction TC. In addition, the projecting portion 50 curves to be convex rearward in the tire rotation direction R (see FIG. 2).

The projecting portion 50 has an inner end portion 51 and an outer end portion 52. The inner end portion 51 is located on an innermost side of the projecting portions 50 in the tread width direction TW, and is continuous to the sidewall 21 of the central land portion row 20C. Meanwhile, the outer end portion 52 is located on an outermost side of the projecting portions 50 in the tread width direction TW. In this embodiment, the outer end portion 52 is located in the high-angle groove 30M1.

The projecting portion 50 is formed such that a width of the projecting portion 50 perpendicular to an extending direction thereof is gradually tapered from the inner end portion 51 to the outer end portion 52 in a tread plan view. In other words, a width (hereinafter referred to as an inner-edge width W1) of the inner end portion 51 perpendicular to the extending direction of the projecting portion 50 is greater than a width (hereinafter referred to as an outer-edge width W2) of the outer end portion 52 perpendicular to the extending direction of the projecting portion 50 (see FIG. 2). In addition, the outer-edge width W2 is smaller than the narrowest width (hereinafter referred to as a lug narrow width W3) of the high-angle groove 30M1 perpendicular to the extending direction thereof (see FIG. 2).

As shown in FIG. 4, a height of the projecting portion 50 in the tire radial direction TR gradually decreases from the inner end portion 51 to the outer end portion 52. In other words, a height (hereinafter referred to as an inner end height H1) of the inner end portion 51 in the tire radial direction TR is greater than a height (hereinafter referred to as an outer end height H2) of the outer end portion 52 in the tire radial direction TR. In addition, the outer end portion 52 is continuous to a groove bottom surface 31 of the high-angle groove 30M1.

The projecting portion 50 has a top surface 510, a leading-side side surface 520, and a trailing-side side surface 530. The top surface 510 inclines with respect to a tread surface (a surface of the central land portion row 20C and a surface of the intermediate land portion row 20M). In other words, the top surface 510 extends continuously from the surface of the central land portion row 20C to the groove bottom surface 31 of the lug groove 30M.

The leading-side side surface 520 is located in a front portion of the projecting portion 50 in the tire rotation direction R. The trailing-side side surface 530 is located in a rear portion of the projecting portion 50 in the tire rotation direction R. The trailing-side side surface 530 is continuous to a leading-side sidewall 41 located in a front portion of the intermediate block 40M in the tire rotation direction R.

(4) Structure of Notched Portions

Figure 5:
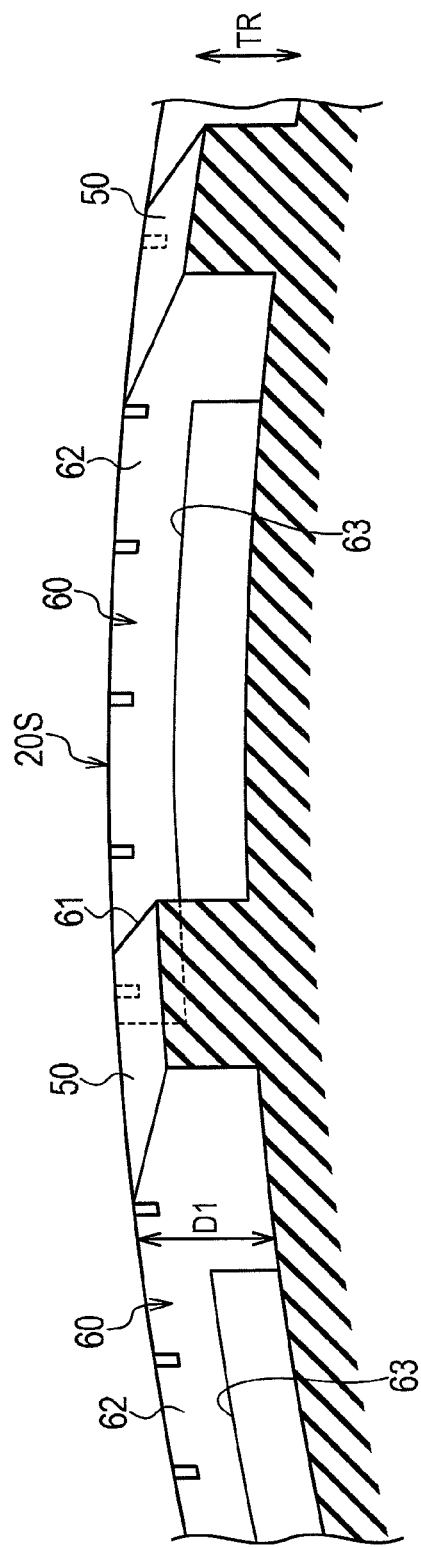
FIG. 5 is a cross-sectional view taken along a line F5-F5 of FIG. 2 and showing a portion of the pneumatic tire 1.

Next, a structure of the notched portions 60 according to this embodiment is described with reference to the drawings. FIG. 5 is a cross-sectional view taken along a line F5-F5 of FIG. 2 and showing a portion of the pneumatic tire 1.

The notched portion 60 is opened to the center-side main groove 10C, and terminated in the central land portion row 20C (see FIGS. 1 and 2). As shown in FIG. 5, a depth (hereinafter referred to as a notch depth D1) of the notched portion 60 in the tire radial direction TR is smaller than a depth of the center-side main groove 10C in the tire radial direction TR (see FIG. 3).

The notched portion 60 has a first wall surface 61, a second wall surface 62, and a bottom surface 63. The first wall surface 61 is located frontward of the second wall surface 62 in the tire rotation direction R. The first wall surface 61 is provided on an extension line L2 extending along the trailing-side side surface 530 of the projecting portion 50 in the tread plan view (see FIG. 3).

The second wall surface 62 is located rearward of the first wall surface 61 in the tire rotation direction R. The second wall surface 62 is provided on an extension line L3 extending along the leading-side side surface 520 of the projecting portion 50 in the tread plan view. The bottom surface 63 is continuous to the first wall surface 61 and the second wall surface 62, and is substantially parallel to the tread plan view.

(5) Comparative Evaluation

Next, to further clarify effects of the invention, a description is given of the following comparative evaluation conducted by use of pneumatic tires according to Comparative Example and Example. Specifically, a description is given of (5.1) Structure of Each Pneumatic Tire and (5.2) Evaluation Results. Note that the present invention is not limited to these examples at all.

(5.1) Structure of Each Pneumatic Tire

First, pneumatic tires according Comparative Example and Example are briefly described. Note that data on each pneumatic tire were measured under conditions shown below.

Figure 6:
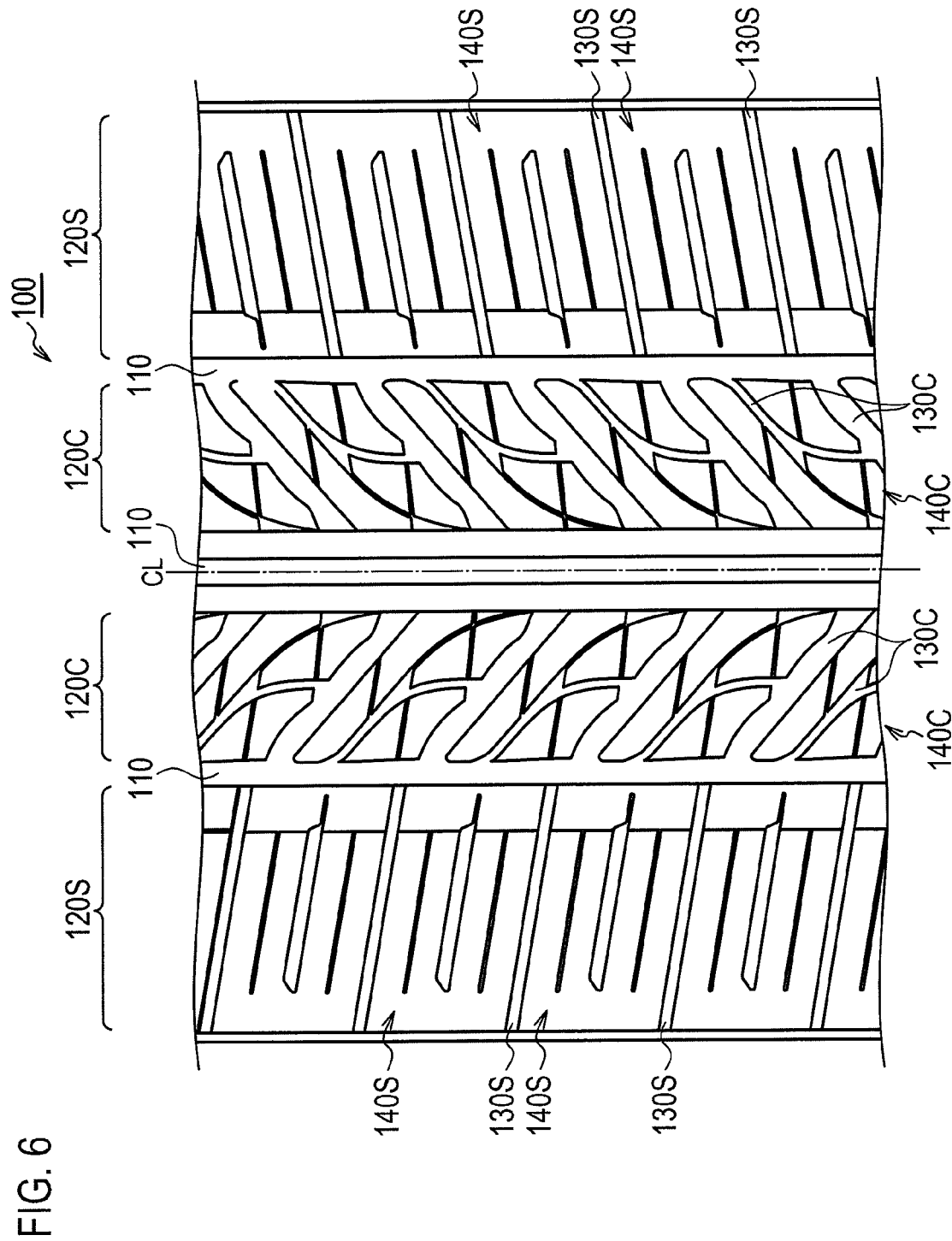
FIG. 6 is a development showing a tread pattern of the pneumatic tire 100 according to Comparative Example.

Tire size: 225/45R17
Tread width: 177 mm
Inner pressure condition: 220 kPa
Loading condition: load equivalent to two occupants In a pneumatic tire 100 according to Comparative Example, a pair of center-side land portion rows 120C and a pair of outer-end land portion rows 120S are formed by three circumferential grooves 110 as shown in FIG. 6. The center-side land portion row 120C is divided into multiple blocks 140C by multiple inclined lug grooves 130C. Meanwhile, the outer-end land portion row 120S is divided into multiple blocks 140S by multiple inclined lug grooves 130S. Note that specifications of the grooves in the pneumatic tire 100 according to Comparative Example are shown in Table 1.

TABLE 1

|  | Groove width (mm) | Inclination angle (degrees) | Groove depth (mm) |
| --- | --- | --- | --- |
| Inclined lug groove | 5 to 6 | 45 | 8 |

The pneumatic tire 1 according to Example is the same as that described in the embodiment (see FIGS. 1 to 5). Note that specifications of the grooves of the pneumatic tire 1 according to Example are shown in Table 2.

TABLE 2

|  | Groove width (mm) | Inclination angle (degrees) | Groove depth (mm) |
| --- | --- | --- | --- |
| High-angle groove | 4 to 8 | 70 | 8 |
| Low-angle groove | 4 to 8 | 30 | 8 |

(5.2) Evaluation Results

Results of the evaluation conducted by use of the above-described pneumatic tires according to Comparative Example and Example are described with reference to Table 3. Specifically, descriptions are given of (5.2.1) Hydroplaning Performance on Wet Road Surface, (5.2.2) Braking Performance on Wet Road Surface, (5.2.3) Driving Stability on Snowy Road Surface, (5.2.4) Driving Performance on Snowy Road Surface, and (5.2.5) Braking Performance on Snowy Road Surface.

TABLE 3

|  | Comparative Example | Example |
| --- | --- | --- |
| Hydroplaning Performance on Wet Road Surface | 100 | 120 |
| Braking Performance on Wet Road Surface | 100 | 105 |
| Driving Stability on Snowy Road Surface | 100 | 115 |
| Driving Performance on Snowy Road Surface | 100 | 120 |
| Braking Performance on Snowy Road Surface | 100 | 120 |

(5.2.1) Hydroplaning Performance on Wet Road Surface

Evaluation of the hydroplaning performance was conducted on a test course with a wet road surface (having a water depth of 7 mm) as follows. Specifically, a vehicle equipped with the pneumatic tires 100 according to Comparative Example was gradually accelerated, and the speed at which a hydroplaning phenomenon occurred was taken as '100.' Then, evaluation was made as to the speed at which a hydroplaning phenomenon occurred with a vehicle equipped with the pneumatic tires 1 according to Example. Note that a larger index indicates a better hydroplaning performance.

As a result, it was found that the vehicle equipped with the pneumatic tires 1 according to Example was superior in hydroplaning performance on the wet road surface, i.e., water drainage performance, to the vehicle equipped with the pneumatic tires 100 according to Comparative Example, as shown in Table 3.

(5.2.2) Braking Performance on Wet Road Surface

Evaluation of the braking performance was conducted on a test course with a wet road surface (having a water depth of 2 mm) as follows. Specifically, the distance (deceleration) traveled until the vehicle equipped with the pneumatic tires 100 according to Comparative Example traveling at a speed of 40 km/h was stopped by full braking was taken as '100.' Then, the deceleration of the vehicle equipped with the pneumatic tires 1 according to Example was evaluated. Note that a larger index indicates a better braking performance.

As a result, it was found that the vehicle equipped with the pneumatic tires 1 according to Example was superior in braking performance on the wet road surface to the vehicle equipped with the pneumatic tires 100 according to Comparative Example, as shown in Table 3.

(5.2.3) Driving Stability on Snowy Road Surface

Evaluation of the driving stability was conducted on a test course with a snowy road surface as follows. Specifically, while the driving stability (during straight driving) of the vehicle equipped with the pneumatic tires 100 according to Comparative Example was taken as '100,' the driving stability of the vehicle equipped with the pneumatic tires 1 according to Example was evaluated based on a professional driver's feeling. Note that a larger index indicates a better driving stability.

As a result, it was found that the vehicle equipped with the pneumatic tires 1 according to Example was superior in driving stability on the snowy road surface to the vehicle equipped with the pneumatic tires 100 according to Comparative Example, as shown in Table 3.

(5.2.4) Driving Performance on Snowy Road Surface

Driving performance evaluation was conducted on a test course with a snowy road surface as follows. Specifically, the time (so-called acceleration time) required until the vehicle equipped with the pneumatic tires 100 according to Comparative Example in a stopped state traveled a distance of 50 m by fully pressing the accelerator was taken as '100.' Then, the acceleration time of the vehicle equipped with the pneumatic tires 1 according to Example was evaluated. Note that a larger index indicates a better driving performance.

As a result, it was found that the vehicle equipped with the pneumatic tires 1 according to Example was superior in driving performance on the snowy road surface to the vehicle equipped with the pneumatic tires 100 according to Comparative Example, as shown in Table 3.

(5.2.5) Braking Performance on Snowy Road Surface

Evaluation of the braking performance was conducted on a test course with a snowy road surface (the road surface was covered with snow to an extent that the original road surface was not exposed) as follows. Specifically, the distance (deceleration) traveled until the vehicle equipped with the pneumatic tires 100 according to Comparative Example traveling at a speed of 40 km/h was stopped by full braking was taken as '100.' Then, the deceleration of the vehicle equipped with the pneumatic tires 1 according to Example was evaluated. Note that a larger index indicates a better braking performance.

As a result, it was found that the vehicle equipped with the pneumatic tires 1 according to Example was superior in braking performance on the snowy road surface to the vehicle equipped with the pneumatic tires 100 according to Comparative Example, as shown in Table 3.

(6) Operation and Effects

In the embodiment described above, the projecting portions 50 are provided in at least the center-side main grooves 10C. This improves a road-surface-scratching effect (edge effect) of the projecting portions 50 on a snowy road surface, thereby improving braking performance and driving performance on a snowy road surface.

In addition, the projecting portion 50 extends outwardly in the tread width direction TW from the sidewall 21 of the central land portion row 20C. This improves the rigidity of the central land portion rows 20C, thereby preventing the central land portion rows 20C from collapsing into the center-side main grooves 10C in case a transverse force (cornering force) acts on the pneumatic tire 1 during turning or the like. For this reason, the driving stability can be also improved.

In addition, the projecting portion 50 is located on the extension line L1 of the lug groove 30M (the high-angle groove 30M1). As a result, rainwater flowing in the center-side main grooves 10C collides with the projecting portions 50, and is guided outwardly in the tread width direction. The guided rainwater passes in the lug grooves 30M, and is drained outwardly in the tread width direction TW. In other words, rainwater flowing in the center-side main grooves 10C is dispersed to the lug grooves 30M, and hence water drainage performance on a wet road surface can be secured. Moreover, the inner end height H1 is greater than the outer end height H2. This secures certain volumes for the center-side main grooves 10C, so that water drainage performance on a wet road surface can be secured more reliably.

In the embodiment, the lug grooves 30M consist of the high-angle grooves 30M1 and the low-angle grooves 30M2. In addition, the inclination angle θ1 is 45 degrees or greater. This facilitates dispersing of rainwater flowing in the center-side main grooves 10C into the high-angle grooves 30M1 during the flowing in the center-side main grooves 10C. Hence, water drainage performance on a wet road surface is improved.

Meanwhile, the low-angle grooves 30M2 are smaller than 45 degrees. This increases the edge effect achieved by the low-angle grooves 30M2, further improving braking performance and driving performance on a snowy road surface.

These lug grooves 30M (the high-angle grooves 30M1 and the low-angle grooves 30M2) are more away from the center-side main grooves 10C outwardly in the tread width direction TW, as the lug grooves 30M extend rearward in the tire rotation direction R. This facilitates achievement of water drainage performance on a wet road surface as well as braking performance and driving performance on a snowy road surface.

In the embodiment, the outer end portion 52 is located in the high-angle groove 30M1. This further facilitates the guiding of rainwater flowing in the center-side main grooves 10C into the high-angle grooves 30M1, improving the water drainage performance on a wet road surface more reliably.

In the embodiment, the projecting portion 50 (the trailing-side side surface 530) is continuous to the leading-side sidewall 41 of the intermediate block 40M. This increases the rigidity of the intermediate block 40M on the side of the leading-side sidewall 41. For this reason, the edge effect achieved by the intermediate blocks 40M is increased, so that the braking performance and the driving performance on a snowy road surface are further improved.

When the inclination angle θ1 is 45 degrees or greater as in the embodiment, a front portion of the intermediate block 40M in the tire rotation direction R has an acute angle. Hence, the rigidity of the intermediate block 40M is prone to deterioration. However, since the projecting portion 50 is continuous to the leading-side sidewall 41, the rigidity of the intermediate blocks 40M can be secured, so that the braking performance and the driving performance on a snowy road surface are improved.

In the embodiment, the height of the projecting portion 50 gradually decreases from the inner end portion 51 to the outer end portion 52, and the outer end portion 52 is continuous to the groove bottom surface 31 of the high-angle groove 30M1. This facilitates the guiding of rainwater flowing in the center-side main grooves 10C into the high-angle grooves 30M1. In addition, the projecting portions 50 can exhibit the edge effect stably even when abrasion progresses.

In the embodiment, the inner-edge width W1 is greater than the outer-edge width W2, and the outer-edge width W2 is smaller than the lug narrow width W3. This secures certain volumes for the high-angle grooves 30M1, facilitating the drainage of rainwater guided into the high-angle grooves 30M1 outwardly in tread width direction TW.

In the embodiment, the notched portions 60 are formed in the central land portion rows 20C. This further improves the edge effect achieved by the notched portions 60 on a snowy road surface, further improving the braking performance and the driving performance on a snowy road surface.

In addition, the notch depth D1 is smaller than the depth of the center-side main grooves 10C. Note that when the notch depth D1 is greater than the depth of the center-side main groove 10C, the rigidity of the central land portion rows 20C may deteriorate, so that the driving stability cannot be secured.

The first wall surface 61 of the notched portions 60 is provided on the extension line L2 extending along the trailing-side side surface 530 of the projecting portion 50 in the tread plan view, and the second wall surface 62 of the notched portions 60 is provided on the extension line L3 extending along the leading-side side surface 520 of the projecting portion 50 in the tread plan view. This effectively utilizes the edge effect achieved by the projecting portions 50 and the edge effect achieved by the notched portions 60, further improving the braking performance and the driving performance on a snowy road surface. In addition, the volume of a portion in the center-side main groove 10C is increased between adjacent projecting portions 50 in the tire circumferential direction TC, so that the water drainage performance on a wet road surface is improved more reliably.

(7) Modification

Figure 7:
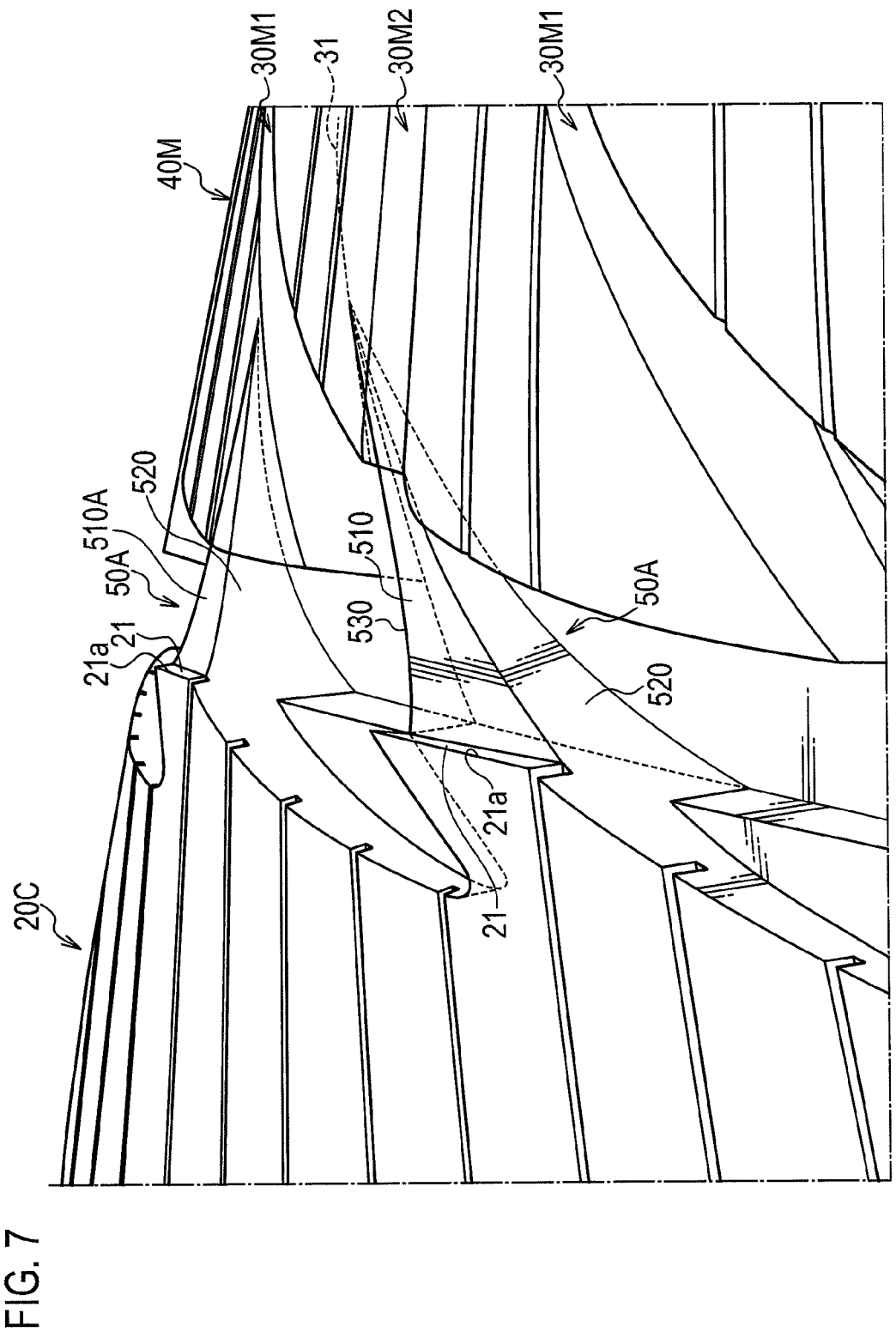
FIG. 7 is an enlarged perspective view showing a vicinity of projecting portions 50 according to the modification.

Next, a modification of the projecting portions 50 according to the above-described embodiment is described with reference to the drawing. FIG. 7 is an enlarged perspective view showing a vicinity of projecting portions 50 according to the modification. Note that the same elements and portions as those in the projecting portions 50 according to the above-described embodiment are denoted by the same reference signs, and different elements and portions are mainly described.

In the above-described embodiment, the top surface 510 of the projecting portion 50 extends continuously from the surface of the central land portion row 20C to the groove bottom surface 31 of the high-angle groove 30M1. In contrast, in this modification, a top surface 510A of a projecting portion 50A extends continuously from the sidewall 21 of the central land portion row 20C to the groove bottom surface 31 of the high-angle groove 30M1, as shown in FIG. 7. In other words, the top surface 510A extends continuously from the sidewall 21 located inside an edge 21a in the tire radial direction TR to the groove bottom surface 31 of the high-angle groove 30M1, the edge 21a being located on an outermost side of the sidewall 21 in the tire radial direction TR.

In the above-described modification, also when the top surface 510A extends continuously from the sidewall 21 of the central land portion row 20C to the groove bottom surface 31 of the high-angle groove 30M1, the braking performance and the driving performance on a snowy road surface can be improved, while the water drainage performance on a wet road surface is secured, as in the case of the embodiment.

(8) Other Embodiments

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

For example, the embodiment of the present invention can be modified as follows. Specifically, in the above-described case, the tire is the pneumatic tire 1 to be filled with air, nitrogen gas, or the like. However, the tire is not limited to this, and may be a solid tire (no-flat tire).

Moreover, it is a matter of course that the tread pattern of the pneumatic tire 1 is not limited to those described in the embodiment, but the tread pattern can be set appropriately depending on a purpose. In other words, it is a matter of course that the structures and the numbers of the circumferential grooves, the lug grooves, the narrow grooves, and the notched portions can be set appropriately depending on a purpose. Moreover, the notched portions 60 do not necessarily have to be formed in the central land portion rows 20C.

For example, the projecting portion 50 does not necessarily have to be located on the extension line L1 extending in the extending direction of the high-angle groove 30M1, but the projecting portion 50 may be located on an extension line (unillustrated) extending in an extending direction of the low-angle groove 30M2. Moreover, the inclination angle θ1 does not necessarily have to be 45 degrees or greater, but may be smaller than degrees. The inclination angle θ2 does not necessarily have to be smaller than 45 degrees, but may be 45 degrees or greater.

In addition, the lug groove 30M does not necessarily have to be curved, and may be linear. Moreover, the outer end portion 52 does not necessarily have to be located in the lug groove 30M, but may be located in the center-side main groove 10C. Furthermore, the projecting portion 50 (the trailing-side side surface 530) does not necessarily have to be continuous to the leading-side sidewall 41 of the intermediate block 40M, but may be continuous to the trailing-side sidewall (unillustrated) of the intermediate block 40M, or may be away from the intermediate block 40M.

Moreover, the projecting portion 50 does not necessarily have to be formed to be gradually lowered from the inner end portion 51 to the outer end portion 52, but may be formed as a stepped shape. In addition, the projecting portion 50 does not necessarily have to be gradually tapered from the inner end portion 51 to the outer end portion 52 in the tread plan view, but may be formed to have a constant width.

As described above, the present invention naturally includes various embodiments which are not described herein. Accordingly, the technical scope of the present invention should be determined only by the matters to define the invention in the scope of claims regarded as appropriate based on the description.

The entire contents of Japanese Patent Application Publication No. 2009-260929 (filed on Nov. 16, 2009) are herein incorporated by reference.

Industrial Applicability

As described above, the tire according to the present invention secures water drainage performance on a wet road surface, while improving braking performance and driving performance on a snowy road surface, in case lug grooves are formed in at least one of multiple rib-like land portions formed by multiple circumferential grooves. Hence, the tire according to the present invention is useful in the field of tire manufacturing.

DESCRIPTION OF REFERENCE SIGNS

1: pneumatic tire
10C: center-side main grooves
10S: end-side main grooves
11: groove bottom surface
20C: central land portion row
20M: intermediate land portion rows
20S: outer-end land portion rows
21: sidewall
21a: edge
30M: lug grooves
30M1: high-angle grooves
30M2: low-angle grooves
30S: lug grooves
31: groove bottom surface
31C: circumferential direction narrow groove
32C: width direction narrow grooves
32M: width direction narrow grooves
32S: width direction narrow grooves
40M: intermediate blocks
41: leading-side sidewall
50, 50A: projecting portion
51: inner end portion
52: outer end portion
60: notched portions
61: first wall surface
62: second wall surface 63: bottom surface
510, 510A: top surface
520: leading-side side surface
530: trailing-side side surface

The invention claimed is:

1. A tire, in which a first land portion row and second land portion rows are formed, the first land portion row being formed by circumferential grooves extending in a tire circumferential direction, the second land portion rows being respectively formed outside the first land portion row in a tread width direction by each of the circumferential grooves, wherein
  a projecting portion projecting outwardly in a tire radial direction from a groove bottom surface of the circumferential groove is provided in at least the circumferential groove,
  the projecting portion is located on an extension line extending in an extending direction of the lug grooves, and extends outwardly in the tread width direction from a sidewall of the first land portion row, the sidewall extending in the tire circumferential direction,
  a height (H1) of an inner end portion of the projecting portion being located on an innermost side thereof in the tread width direction and being continuous to the first land portion row is greater than a height (H2) of an outer end portion of the projecting portion located on an outermost side thereof in the tread width direction,
  wherein the outer end portion is located in the lug groove, and
  wherein the projecting portion is continuous to a leading-side sidewall located in a front portion of each of the blocks in a tire rotation direction.

2. The tire according to claim 1, wherein
  an angle (θ1) formed by a perpendicular line perpendicular to a tire equator line and each lug groove is 45 degrees or greater, and
  the lug groove is more away from the circumferential groove outwardly in the tread width direction, as the lug groove extends rearward in a tire rotation direction.

3. The tire according to claim 1, wherein
  a height of the projecting portion gradually decreases from the inner end portion to the outer end portion, and the outer end portion is continuous to the groove bottom surface of the lug groove.

4. The tire according to claim 1, wherein
  a width (W1) of the inner end portion perpendicular to an extending direction of the projecting portion is greater than a width (W2) of the outer end portion perpendicular to the extending direction of the projecting portion, and
  the width (W2) of the outer end portion is smaller than a narrowest width (W3) of the lug groove perpendicular to the extending direction thereof.

5. The tire according to claim 1, wherein
  a notched portion is formed in the first land portion row, the notched portion being opened to the circumferential groove and terminated in the first land portion row, and
  a depth (D1) of the notched portion is smaller than a depth of the circumferential groove.

6. The tire according to claim 5, wherein
  the notched portion has
  a first wall surface, and
  a second wall surface located rearward of the first wall surface in the tire rotation direction,
  the first wall surface is provided on an extension line along a trailing-side side surface located in a rear portion of the projecting portion in the tire rotation direction in a tread plan view, and
  the second wall surface is provided on an extension line along a leading-side side surface located in a front portion of the projecting portion in the tire rotation direction in the tread plan view.

7. The tire according to claim 1, wherein
  a leading-side corner portion of blocks forming the second land portion row is not chamfered.

8. The tire according to claim 1, wherein
  a width of the projecting portion narrows from a leading-side to a kicking side.

9. The tire according to claim 1, wherein
  a lug groove includes a high-angle lug groove and a low-angle lug groove, and
  the outer end of the projecting portion is located in the high-angle lug groove only.

\* \* \* \* \*